United States Patent
Owens

(10) Patent No.: US 11,341,321 B2
(45) Date of Patent: May 24, 2022

(54) UI ENABLING MAPPING ENGINE SYSTEM AND PROCESS INTERCONNECTING SPREADSHEETS AND DATABASE-DRIVEN APPLICATIONS

(71) Applicant: UXSTORM, LLC, Damascus, MD (US)

(72) Inventor: Reed Wentworth Owens, Damascus, MD (US)

(73) Assignee: UXStorm, LLC, Damascus, MD (US)

( * ) Notice: Subject to any disclaimer, the term of this patent is extended or adjusted under 35 U.S.C. 154(b) by 0 days.

(21) Appl. No.: 16/642,937

(22) PCT Filed: Oct. 22, 2018

(86) PCT No.: PCT/IB2018/058216
§ 371 (c)(1),
(2) Date: Mar. 10, 2020

(87) PCT Pub. No.: WO2019/077592
PCT Pub. Date: Apr. 25, 2019

(65) Prior Publication Data
US 2020/0349320 A1    Nov. 5, 2020

Related U.S. Application Data

(60) Provisional application No. 62/575,370, filed on Oct. 20, 2017.

(51) Int. Cl.
*G06F 40/18*        (2020.01)
*G06F 40/186*       (2020.01)
(Continued)

(52) U.S. Cl.
CPC ............ *G06F 40/18* (2020.01); *G06F 40/106* (2020.01); *G06F 40/174* (2020.01); *G06F 40/186* (2020.01)

(58) Field of Classification Search
CPC .......... G06F 40/18; G06F 40/186; G06F 16/86
See application file for complete search history.

(56) References Cited

U.S. PATENT DOCUMENTS

| 6,631,497 B1 | 10/2003 | Jamshidi et al. |
| 2004/0103365 A1 | 5/2004 | Cox |

(Continued)

OTHER PUBLICATIONS

Bendre et al., Towards a Holistic Integration of Spreadsheets with Databases: A Scalable Storage Engine for Presentational Data Management, Oct. 6, 2017, technical paper found at https://arxiv.org/abs/1708.06712 (Year: 2017).*

(Continued)

*Primary Examiner* — Scott T Baderman
*Assistant Examiner* — Seung Woon Jung
(74) *Attorney, Agent, or Firm* — Law Office of Oliver Edwards LLC; Oliver Edwards

(57) ABSTRACT

The present invention relates to a new method to create a new User Interface to Database Data. A Spreadsheet is used as a UI, and the Data presented to the End User is into the Spreadsheet in a repeatable manner A Record serves as the basis of the Data to be presented and the Lists from the List Views are mapped into Managed Regions in the Spreadsheet as in the combination of the Form View and List View. This provides a new means to create Applications. An existing Spreadsheet can be used to create a new Application. The Spreadsheet mappings are created. These mappings are then used to create the Tables in the Database to store the required data and relationships. The End User UI is now complete, because the Spreadsheet is now the UI for the End User using the Mapping Engine to Process User Action.

6 Claims, 13 Drawing Sheets

(51) Int. Cl.
*G06F 40/106* (2020.01)
*G06F 40/174* (2020.01)

(56) References Cited

U.S. PATENT DOCUMENTS

| | | |
|---|---|---|
| 2005/0044486 A1 | 2/2005 | Kotler et al. |
| 2005/0273695 A1 | 12/2005 | Schnurr |
| 2006/0075328 A1 | 4/2006 | Becker et al. |
| 2007/0250764 A1 | 10/2007 | Jiang |
| 2008/0244377 A1 | 10/2008 | Erwig |
| 2009/0158251 A1* | 6/2009 | Angrish .................. G06F 16/84 717/115 |
| 2010/0269092 A1 | 10/2010 | Dorman |
| 2019/0294664 A1* | 9/2019 | Krappe ................. G06F 40/186 |

OTHER PUBLICATIONS

Written Opinion of the International Searching Authority, International Application No. PCT/IB2018/058216, International Filing Date Oct. 22, 2018.

* cited by examiner

| ID | Name | Department | Begin Date | End Date | Sub Total | Advances | Total | Status |
|---|---|---|---|---|---|---|---|---|
| 1 | Reed Owens | IT | 12/1/2016 | 12/7/2016 | $1,022.33 | $0.00 | $1,022.33 | Paid |
| 2 | Reed Owens | IT | 12/8/2016 | 12/14/2016 | $525.22 | $0.00 | $525.22 | Paid |
| 3 | Reed Owens | IT | 12/15/2016 | 12/21/2016 | $755.67 | $0.00 | $755.67 | Processing |
| 4 | Reed Owens | IT | 12/22/2016 | 12/31/2016 | $44.99 | $0.00 | $44.99 | Need Approval |
| 5 | Reed Owens | IT | 1/1/2017 | 1/7/2017 | $639.12 | $111.00 | $528.12 | Draft |
| 6 | Aaron Fisk | Marketing | 1/1/2017 | 1/7/2017 | $578.24 | $100 | $478.24 | Processing |

FIG. 1

| ID | Expense ID | Date | Account | Description | Miles | Hotel | Transportation | Misc |
|---|---|---|---|---|---|---|---|---|
| 1 | 5 | 1/1/2017 | 2001 | Day One Charges | 22 | $125.25 | $354.86 | $10.00 |
| 2 | 5 | 1/2/2017 | 3100 | Day Two Charges | 22 | $125.25 | $0.00 | $0.00 |
| 3 | 1 | 12/1/2016 | 2002 | Cust Two Meeting | 31 | $110.00 | $458.37 | $0.00 |
| 4 | 1 | 12/2/2016 | 2002 | Cust Two Meeting | 31 | $110.00 | $0.00 | $0.00 |
| 5 | 1 | 12/3/2016 | 3200 | Onsite Visit | 56 | $125.00 | $0.00 | $0.00 |
| 6 | 1 | 12/4/2016 | 3200 | Onsite Visit | 56 | $125.00 | $0.00 | $0.00 |

FIG. 2

| ID | Department | Mileage | Hotel | Transport | Misc |
|---|---|---|---|---|---|
| 1 | IT | $200.00 | $225.00 | $500.00 | $100.00 |
| 2 | Marketing | $100.00 | $225.00 | $1,000.00 | $1,000.00 |

FIG. 3

Expense Report 1/1/2017

Name: Reed Owens  
Department: IT  
Advances: $111.00

Begin Date: 1/1/2017  
End Date: 1/7/2017  
Total: $528.12

Expenses per Day

| Date | Account | Description | Miles | Hotel | Transport | Misc. | Total |
|---|---|---|---|---|---|---|---|
| 1/1/2017 | 2001 | Day One Charges | 22 | $125.25 | $354.86 | $10.00 | $501.99 |
| 1/2/2017 | 3100 | Day Two Charges | 22 | $125.25 | $0.00 | $0.00 | $137.13 |

Max Amount

| Mileage | Hotel | Transport | Misc |
|---|---|---|---|
| $200.00 | $225.00 | $500.00 | $100.00 |

Last Expenses

| Date | Total | Status |
|---|---|---|
| 12/1/2016 | $1,022.33 | Paid |
| 12/8/2016 | $525.22 | Paid |
| 12/15/2016 | $755.67 | Processing |
| 12/22/2016 | $44.99 | Need Approval |

|   | A | B | C | D | E | F | G | H | I | J | K | L |
|---|---|---|---|---|---|---|---|---|---|---|---|---|
| 1 |   |   |   |   |   |   |   |   |   |   |   | 500 |
| 2 | Name: | Reed Owens | Begin Date: | Jan 1, 2017 |   |   |   |   |   |   |   |   |
| 3 | Department: | IT | End Date: | Jan 7, 2017 |   |   |   |   |   |   |   |   |
| 4 | DATE | ACCOUNT | DESCRIPTION | MILES | HOTEL | TRANSPORT | MISC. | TOTAL |   | Max Amount | | |
| 5 | 1/1/2017 | 2001 | Day One Charges | 22 | $125.25 | $354.86 | $10.00 | $501.99 |   | Mileage | $200.00 | |
| 6 | 1/2/2017 | 3100 | Day Two Charges | 22 | $125.25 | $0.00 | $0.00 | $137.13 |   | Hotel | $225.00 | |
| 7 |   |   |   |   |   |   |   |   |   | Transport | $500.00 | |
| 8 |   |   |   |   |   |   |   |   |   | Misc | $100.00 | |
| 9 |   |   |   |   |   |   |   |   |   |   |   |   |
| 10 |   |   |   |   |   |   |   |   |   | Last Expenses | | |
| 11 |   |   |   |   |   |   |   |   |   | Date | Total | Status |
| 12 |   |   |   |   |   |   |   |   |   | 12/1/2016 | $1,022.33 | Paid |
| 13 |   |   |   |   |   |   |   |   |   | 12/8/2016 | $525.22 | Paid |
| 14 |   |   |   |   |   |   | Subtotal | $639.12 |   | 12/15/2016 | $755.67 | Processing |
| 15 |   |   |   |   |   |   | Advances | $111.00 |   | 12/22/2016 | $44.99 | Need Approval |
| 16 |   |   |   |   |   |   | Total | $528.12 |   |   |   |   |

FIG. 5

|   | A | B | C | D | E | F | G | H | I | J | K | L |
|---|---|---|---|---|---|---|---|---|---|---|---|---|
| 1 |   |   |   |   |   |   |   |   |   |   |   |   |
| 2 | Name: | Reed Owens |   | Begin Date: | Jan 1, 2017 |   |   |   |   |   |   |   |
| 3 | Department: | IT |   | End Date: | Jan 7, 2017 |   |   |   |   |   |   |   |
| 4 | DATE | ACCOUNT | DESCRIPTION | MILES | HOTEL | TRANSPORT | MISC. | TOTAL |   | Max Amount |   |   |
| 5 | 1/1/2017 | 2001 | Day One Charges | 22 | $125.25 | $354.86 | $10.00 | $501.99 |   | Mileage | $200.00 |   |
| 6 | 1/2/2017 | 3100 | Day Two Charges | 22 | $125.25 | $0.00 | $0.00 | $137.13 |   | Hotel | $225.00 |   |
| 7 |   |   |   |   |   |   |   |   |   | Transport | $500.00 |   |
| 8 |   |   |   |   |   |   |   |   |   | Misc | $100.00 |   |
| 9 |   |   |   |   |   |   |   |   |   |   |   |   |
| 10 |   |   |   |   |   |   |   |   |   |   | Last Expenses |   |
| 11 |   |   |   |   |   |   |   |   |   | Date | Total | Status |
| 12 |   |   |   |   |   |   | Subtotal | $639.12 |   | 12/1/2016 | $1,022.33 | Paid |
| 13 |   |   |   |   |   |   | Advances | $111.00 |   | 12/8/2016 | $525.22 | Paid |
| 14 |   |   |   |   |   |   | Total | $528.12 |   | 12/15/2016 | $755.67 | Processing |
| 15 |   |   |   |   |   |   |   |   |   | 12/22/2016 | $44.99 | Need Approval |
| 16 |   |   |   |   |   |   |   |   |   |   |   |   |

FIG. 7

|    | A | B | C | D | E | F | G | H | I | J | K | L |
|----|---|---|---|---|---|---|---|---|---|---|---|---|
| 1  |   |   |   |   |   |   |   |   |   |   |   |   |
| 2  |   | Name: | Reed Owens |   |   |   |   |   |   | Max Amount | | |
| 3  |   | Department: | IT | Begin Date: | Jan 1, 2017 | | | | | | | |
| 4  |   |   |   | End Date: | Jan 7, 2017 | | | | | Mileage | $200.00 | |
| 5  | DATE | ACCOUNT | DESCRIPTION | MILES | HOTEL | TRANSPORT | MISC. | TOTAL | | Hotel | $225.00 | |
| 6  | 1/1/2017 | 2001 | Day One Charges | 22 | $125.25 | $354.86 | $10.00 | $501.99 | | Transport | $500.00 | |
| 7  | 1/2/2017 | 3100 | Day Two Charges | 22 | $125.25 | $0.00 | $0.00 | $137.13 | | Misc | $100.00 | |
| 8  |   |   |   |   |   |   |   |   |   |   |   |   |
| 9  |   |   |   |   |   |   |   |   |   | Last Expenses | | |
| 10 |   |   |   |   |   |   |   |   |   | Date | Total | Status |
| 11 |   |   |   |   |   |   |   |   |   | 12/1/2016 | $1,022.33 | Paid |
| 12 |   |   |   |   |   |   |   |   |   | 12/8/2016 | $525.22 | Paid |
| 13 |   |   |   |   |   |   |   |   |   | 12/15/2016 | $755.67 | Processing |
| 14 |   |   |   |   |   |   | Subtotal | $639.12 | | 12/22/2016 | $44.99 | Need Approval |
| 15 |   |   |   |   |   |   | Advances | $111.00 | | | | |
| 16 |   |   |   |   |   |   | Total | $528.12 | | | | |

FIG. 8

UI ENABLING MAPPING ENGINE SYSTEM AND PROCESS INTERCONNECTING SPREADSHEETS AND DATABASE-DRIVEN APPLICATIONS

TECHNICAL FIELD

Embodiments of the present invention are directed to mapping engines enabling spreadsheets to be user interfaces for database data and database-driven applications.

BACKGROUND ART

Applications and databases provide user interfaces to their data in several different methodologies. One method is to list data from a table and present it into a simple table or show the results of one record as a form for the end user to view and potentially modify. This has worked well over the years when the data is simple, however, applications and data have become more complex with multiple tables of data needed to provide the appropriate information to the end user. From this, another method arose. This is to show the "Form" from a single record and any related information in tables on the form. This enables the end user to use data on the single record and all related information from other tables on a single form. For example, see FIG. 1 expense Table 100, an example of a database table for expense reports. It contains all the needed data for an Expense application, however more information from other tables is necessary. See FIG. 2 Day Expense Table 200, a table containing the daily expenses for the expense. Records with ID's of 3-6 are related to Expense Table record with ID of 1. The application can use these records to calculate the total expenses that is in Expense Table record ID of 1 total field. In addition, see FIG. 3 Expense Max Table 300, a table containing the maximum amounts that can be charged per department. Using the department fields in these records and the Expense Table 100 record, the application can ensure that the departmental maximums are not exceeded. This is an example of multiple tables, having diverse relationships, that are needed by an application. This data is presented to the user in an Application interface such as FIG. 4 Application Expense Report 400, an example using the data for Expense Table 100 with ID 1 in an Application window.

While this has been a success, there are several limitations to this approach:

1) It requires the end user to learn the form.

2) Adding, deleting, and updating related data can become confusing, error-prone, and difficult for the end user. It may require multiple screen/form changes to perform these actions.

3) Data calculations presented on the form, such as summing the cost field of a related table, may only appear on the form and not in the database. Thus, they can be impossible or difficult to change. Many times, advanced calculations are coded into the application.

To resolve these issues, spreadsheets may be utilized. A spreadsheet is a computer application having a collection of data entered in rows and columns. Each collection of data is commonly referred to as a worksheet. Each row is commonly referred to by an integer number starting at 1 on the first row and increasing by 1 for each additional row in the spreadsheet. Each column is commonly referred to by a letter of the alphabet. Each digit in the column name uses a letter A-Z to represent a number of 0-25 in a numeric base of 26. This means column #1 is A, column #26 is Z, column #27 is AA and so on. With these references, a single cell can be referenced by its column and row; thus A1 is the first cell in a spreadsheet as it is column 1 row 1. A set of cells can be referenced in what is commonly known as a range by specifying a top left cell:bottom right cell.

Cells can contain different types of data such as numbers, currency, dates, text, or formulas. Formulas can reference cells and ranges in their computations and display to the user the results of the computations.

A spreadsheet can be made up of multiple worksheets, each of which can have different data. Cells and ranges from one worksheet can be referenced on different worksheets within the same spreadsheet.

To resolve the Application issues, Applications export to spreadsheet formats. This allows an interface that many users already know, and which is flexible in its calculation model. This makes the data from the database or database application more flexible for the end user and easier to use. However, changes to the data are not reflected into the database. This makes this type of methodology useful for reporting or analysis.

This can be seen from such patents as U.S. Pat. No. 8,082,489, "Using a Spreadsheet Engine as a Server-Side Calculation Model" and U.S. Pat. No. 6,631,497, "Binding Data from Data Source to Cells in a Spreadsheet." These patents acknowledge spreadsheets as a better interface to the end user, and attempt to use them for displaying the data or using the calculation model. U.S. Pat. No. 8,082,489 saves the calculation data model on an application server and enables a more flexible calculation model, but it still involves the traditional approach to the end user interface. U.S. Pat. No. 6,631,497 uses a spreadsheet for the end user interface for data from a database. It requires the user to select the data, relationships, and fields to bind on the spreadsheet. While the data does affect the calculation model, unlike U.S. Pat. No. 8,082,489, there is no means to synchronize these results back to the database. This method is an interface to data from a database but could not be used as an end user interface to an application. It is better described as an interface to a report of data, but doesn't allow for it to be a standard application user interface.

An example of the use of a spreadsheet from a database or database-driven application is seen from the previous example of data on a form in an application seen in FIG. 4—Application Expense Report and a spreadsheet with the same data in FIG. 5, Expense Report Spreadsheet 500. The information/data on the application form is displayed in a spreadsheet. The user can then use the spreadsheet functionality to analyze, print, and change the data. However, any changes are "lost" as the data is not synchronized back to the database.

SUMMARY

Embodiments of the present invention may provide an algorithmic mapping engine between a database and/or database-driven application and cell(s)/range(s) in a spreadsheet to enable the use of the spreadsheet as a user interface to the data/application.

In one embodiment of the present invention, a mapping engine is provided which provides the mapping capabilities that enable:

Initial generation of a spreadsheet from existing data using a base record

Ability for the user to make changes in the spreadsheet and have the corresponding data in the database/application reflect the changes Ability for the user to make changes in the spreadsheet which are not mapped, yet may be used in the spreadsheet calculation engine to derive results that may be mapped Ability to leverage the spreadsheet calculation engine to derive results which are mapped back to the database/application Ability to handle a dynamic number of records from a query that are mapped into a range in a spreadsheet, and handle when there are a smaller or greater number of records than the specified range can contain In one embodiment, there is provided a method for using a spreadsheet as a user interface to a database operably connected to a computer system, the computer system having one or more processors and storage, the method carried out through execution of program instructions executed by the one or more processors. The method may include steps and processes to retrieve, manipulate, and store data in a plurality of data structures including databases and spreadsheets. The data structures may also include cell maps, a cell map being adapted to bidirectional mapping or translating of data values inputted and displayed via a spreadsheet to data values stored and retrieved from a database. The data structures may also include column maps, a column map being a data structure associating a database table field with a spreadsheet range column and optionally having one or more cell maps. The data structures may also include table maps, a table map being a data structure associating a query on a database table with a spreadsheet range and optionally having one or more column maps. The data structures may also include field maps, a field map being a data structure associating a database table field with a spreadsheet cell and optionally having one or more cell maps. The data structures may also include record maps, a record map being a data structure identifying a database table and having a query on the database table, and optionally having one or more field maps. The data structures may also include a template, the template which may have a spreadsheet, table maps, and record maps of which one is a base record map.

The method may include instantiating a mapping engine by retrieving a template from storage or the database and iterating, over the template's table maps and record maps beginning with the base record map, the following steps:

If the iteration is for a record map: using the query associated with the iterated record map to retrieve a record from the database and iterating over each field map associated with the iterated record map to update the spreadsheet cell associated with the iterated field map with the data from the retrieved record stored at the field associated with the iterated field map, applying the mapping or translation designated in the cell map associated with the iterated field map, if any.

If the iteration is for a table map: using the query associated with the iterated table map to retrieve one or more records from the database and iterating over each retrieved record as follows: iterating over each column map associated with the iterated table map to update a spreadsheet cell at R:C in the range associated with the iterated table map with the data from the iterated retrieved record stored at the field associated with the iterated column map, applying the mapping or translation designated in the cell map associated with the iterated column map, if any, where C is the column associated with the iterated column map and R is the ordinal number of the current retrieved record iteration for the iterated table.

Instantiating the mapping engine may also include installing calls to the mapping engine into the spreadsheet, whereby when the user attempts an action on the spreadsheet, the mapping engine is called.

The method may include presenting the spreadsheet to the user and invoking the mapping engine when the user takes an action affecting a cell in the spreadsheet. The mapping engine may determine whether the cell is associated with any table map or record map in the template and, if not, then permitting the action. The mapping engine may determine whether the cell is in a range associated with a table map in the template and the action is to change the value of the cell and, if so, then: permitting the action affecting the cell, determining whether a record for the cell exists in the table associated by the associated table map and inserting a record if the record does not exist, and storing the cell value resulting after the action in the database after first applying the mapping or translating designated in a cell map associated with the cell. The mapping engine may determine whether the cell is in a range associated with a table map in the template and the action is to add a row and, if so, adding a new row by: making a copy of the spreadsheet row containing the last row in the associated range, causing the spreadsheet to insert a new row above the last row in the associated range, iterating over each cell in the new row by copying, if the iterated cell is not in a table map or record map, any format and formula of the cell in the same column in the copy of the spreadsheet row to the iterated cell, iterating over each field map associated with one or more cells in the new row, updating the iterated field map with the new cell location, and iterating over each table map associated with one or more cells in the new row, copying any format from the same column in the copy of the spreadsheet row correspondingly to each of the one or more cells, and if necessary, updating the iterated table map with new row size information.

The mapping engine may determine whether the cell is in a range associated with a table map in the template and the action is to delete a row and, if so, then deleting the corresponding record from the database and refreshing the associated table map to reflect the deletions. The mapping engine may determine whether the cell is associated with any table map or record map in the template and not in a range associated with a table map in the template and, if so, then permitting the action affecting the cell and storing the cell value resulting after the action in the database after first applying the mapping or translating designated in a cell map associated with the cell.

The method may also include steps of determining whether a cell is protected when the user takes an action affecting a cell in the spreadsheet, and denying the action if the cell is determined to be protected. In some embodiments the field map and column map data structures each further comprise protection indication flags and if the cell is associated with a field map or column map for which the protection indication flag indicates that the cell is protected, then the action is denied. The action may also be denied if it is determined that the database does not permit the user to make changes to the database on a database level or field level or record level In some embodiments, using a query associated with a record map or table map includes dynamically modifying the query with one or more values obtained via a reference. The one or more values obtained via a reference may include one or more values obtained using a base record reference, a record map reference, or a reference to a spreadsheet cell.

BRIEF DESCRIPTION OF DRAWINGS

For a comprehensive exposure of the features, nature and advantageous effects of the present invention, reference is now made to the detailed description in conjunction with the associated drawings, in which:

FIG. 1 is an exemplary illustration of an Expense Table, including exemplary expense data.

FIG. 2 is an exemplary illustration of a Day Expense Table, including exemplary day expense data as may be used in a database or database-driven application for some daily expenses associated with an expense report. They are linked to the report by the field Expense ID which matches the ID in Expense Table 100 (FIG. 1)

FIG. 3 is an exemplary illustration of an Expense Max Table, including exemplary expense max data.

FIG. 4 is an exemplary illustration of an Expense Application Form, with exemplary expense data, showing what an expense form may look like in an application with the data from Expense Table 100, Day Expense Table 200, and Expense Max Table 300.

FIG. 5 is an exemplary illustration of an Expense Report Spreadsheet with exemplary expense data. It shows what a spreadsheet for an expense report may look like using the data from Expense Table 100, Day Expense Table 200, and Expense Max Table 300.

FIG. 7 is an exemplary illustration of the Expense Report Spreadsheet Table Mappings, a spreadsheet highlighting the ranges in the Expense Report Spreadsheet which are a Table Map.

FIG. 8 is an exemplary illustration of the Expense Report Spreadsheet Record Mappings, a spreadsheet highlighting the cells in the Expense Report Spreadsheet which are from a Record Map.

DESCRIPTION OF EMBODIMENTS

In one aspect of the invention, a mapping engine may permit use of a Spreadsheet as a User Interface to data in a database or database-driven application. The result is to be able to generate and map data from the database or database-driven application into a spreadsheet and have any changes in the spreadsheet be saved back to the database, which will allow for the use of the calculation engine in the spreadsheet. In doing this, it is necessary that normal spreadsheet functionality be augmented. This augmentation will allow for the handling of spreadsheet changes by the database, and presenting appropriate data choices.

Figure 6:
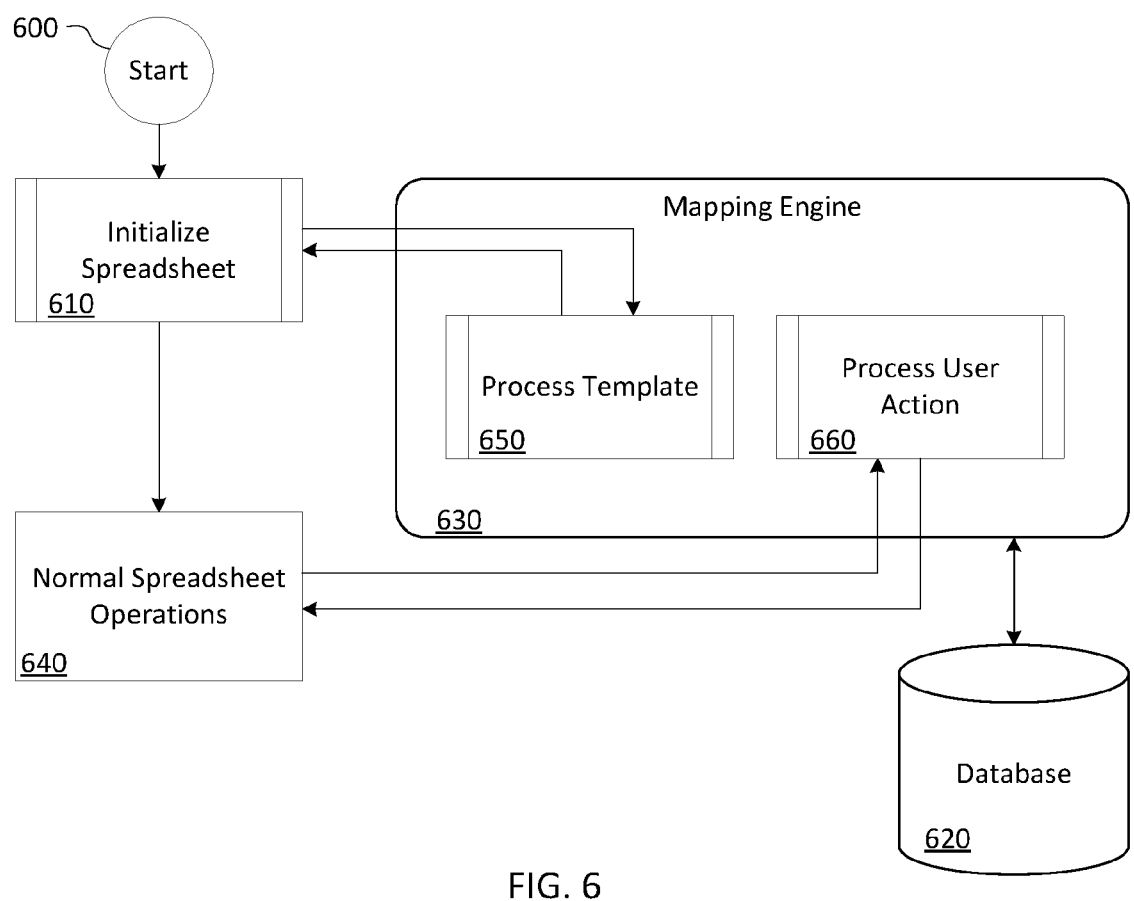
FIG. 6 is an exemplary illustration of a Mapping Engine process in accordance with embodiments of the invention, illustrating overall usage of the Mapping Engine and how it is used to enable a spreadsheet to be a user interface for the data in a database or database-driven application.

With reference to FIG. 6, a Mapping Engine in accordance with embodiments of the present invention may be used for two processes: creation or initialization of the spreadsheet, and handling of normal spreadsheet operations. After start step 600 and during the initialization of a spreadsheet in step 610, the spreadsheet is generated by calling the Process Template process 650. The result of this process will be a spreadsheet with the appropriate data, security, and initialization of Mapping Engine 630 with the data from database 620 for the current data in the spreadsheet. When this is done, the result is passed to the spreadsheet application. While normal spreadsheet operations 640 are handled, they are processed using Mapping Engine 630 at step 660 to ensure that changes are allowed and are saved back to database 620. This allows the spreadsheet to be an interface to the data and not just a means of reporting.

While the result looks like a spreadsheet, certain cells and ranges must be mapped between the spreadsheet and the database. To do this, there will be two types of mappings:

Table Map—maps the fields from records into a range in the spreadsheet. This is seen in FIG. 7—Expense Report Spreadsheet Table Mappings, where range A5:G13 is mapped to the data from table Day Expense Table 200, and range J12:L15 is mapped from table Expense Table 100. Fields from multiple records from these tables are mapped into their respective ranges.

A Record Map maps fields from a single record into cells in a spreadsheet. This is illustrated in FIG. 8. Cells B2, B3, D2, D3, H14, H15, and H16 are mapped from fields from the record in Expense Table 100 with field ID of 5. Cells K5, K6, K7, and K8 are mapped from fields from the record in Expense Max Table 300 with the field ID of Department of IT.

Figure 10:
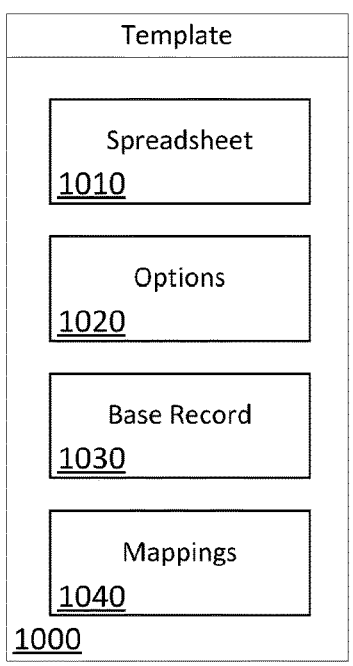
FIG. 10 is an exemplary illustration of a Template, illustrating contents of a Template which is used by the Mapping Engine.

While these Maps are important, so is that the loading of the template that contains all information needed to generate or update a spreadsheet. See FIG. 10 and exemplary Template 1000 for the contents of a template. It may include spreadsheet 1010, a saved version of the spreadsheet in the spreadsheet Application native format. As an example, for Microsoft Excel spreadsheets it can be an XLS file. Options 1020 may include implementation-specific options for the resulting end user interface in the spreadsheet application.

Base Record 1030 is a record in the database that may be used as a basis for all data and relationships for the Maps. This may be saved as part of the Template or can be provided as part of the initialization to dynamically generate a "new" spreadsheet from any record in the base record table. Mappings 1040 are a collection of the Table and Record Maps for the Template 1000.

Figure 9:
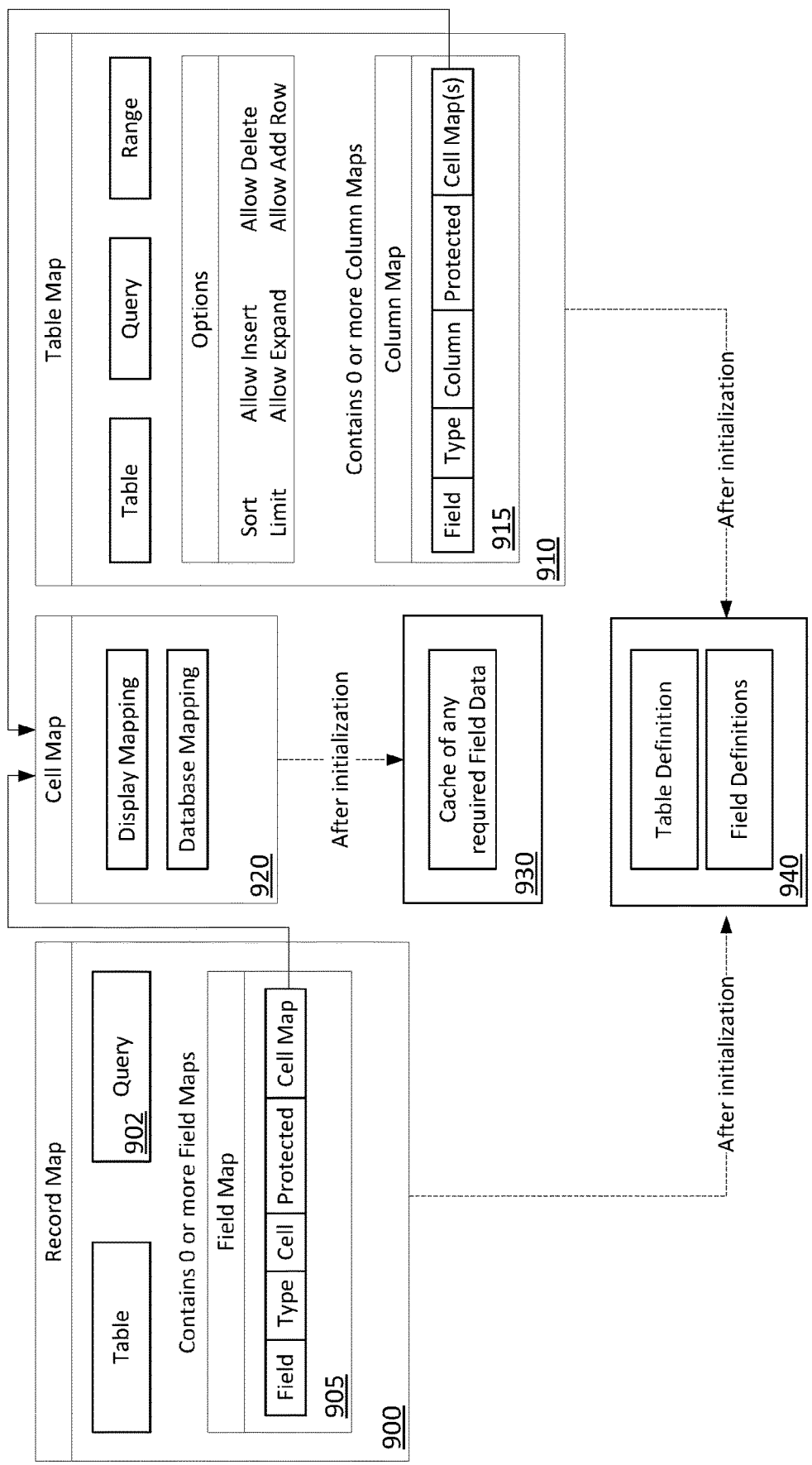
FIG. 9 is an exemplary illustration of the Mapping Types, illustrating contents and relationships of the two main Mapping Types (Table and Record) along with the contained Field Map(s) and Column Map(s).

FIG. 9 illustrates Mapping Types. For example, Record Map 900 may contain the name of the table from the database used for the mapping. The record to be mapped is determined by Query 902 which can be a query for Base Record 1030 or can use information from Base Record 1030 to query for a related record, like in FIG. 8. This is an example where the Base Record 1030 is Expense Table 100 with field ID of 5. Data from Base Record 1030 is mapped to cells B2, B3, D2, D3, H14, H15, and H16. While cells K5, K6, K7, and K8 are mapped from a query from Expense Max Table 300 where field Department is the same as the Base Record field Department, where in this case the Department name is IT. These are two examples of a Record Map.

To provide a mapping of each field in a Record Map, a Field Map 905 is defined for each field to be mapped. This contains the name of the field from the database, the data type used to handle any mapping or data conversions, the spreadsheet cell in which to place the field data, a flag to determine if the cell is protected, and a Cell Map. If a field is protected, then it is read-only to the end user. A Cell Map 920 is a detailed structure and is dynamic upon the database and spreadsheet. It contains any "Display Mappings" that can take the database data and present it to the end user. For instance, the database may contain an integer number between 1 and 50, but the display may be one of the 50 states in the US. This mapping would then contain the mapping between the State Names and the Integer Number. It will also contain the reverse, a Database Mapping, if needed to convert and communicate what the user inputs into a cell to an appropriate database structure. This enables the spreadsheet cells to contain lists and choices from other tables in the database, but still be presentable to the end user.

Table Map 910 may contain the name of the table from the database which is used for the mapping, a Range for the location on the spreadsheet for the data to be mapped, Options to specify how to handle the user interface to the mapped table, a list of Column Maps 915 specifying which fields are mapped and to which column in the Range, and a Query. The records to be mapped is determined by the Query. The Query can use information from Base Record 1030 to query for a related record, like in FIG. 7 Expense Report Spreadsheet Table Mappings. This is an example where the Base Record is Expense Table 100 with field ID of 5 and two Table Maps. The first Table Map Range is A5:G6. This example shows two records from Day Expense Table 200 where the field Expense ID is "5" which is the ID of the Base Record. The second Table Map Range is J12:L15 which shows 4 records from the Expense Table 100 where the field Name is "Reed Owens" and the field End Date is before the Base Record field Begin Date of Jan. 1, 2017.

Column Maps 915 determine which columns from the table are mapped to which fields. Each Table Map 910 contains zero or more Column Maps 915. Column Map 915 contains the field name from the table, a flag to determine if the column is protected, into which column in the range the field should be mapped, and a Cell Map(s) 920.

After Mapping Engine 630 is initialized, it will contain information about the Table Definitions of all tables used from the database, and all the Field Definitions used. This allows the spreadsheet to be database-aware of any security, choices, relationships, and data types from the database, and to be able to handle them appropriately during the spreadsheet UI functions. Such information concerning Table Definitions and Field Definitions may be stored in Mapping Engine data structure 940. When lists, relationships, choices, etc. are retrieved for a field, the data is cached in the Mapping Engine cache 930 to enable faster response.

At this point, normal spreadsheet operations 640 occur and are processed by Mapping Engine 630. This ensures they are allowed and are processed correctly for the mapping to the database/database-driven application.

As shown in FIG. 6, there are two major process points to Mapping Engine 630: the initialization using the Process Template process 650, and the Process User Action process 660.

Figure 11:
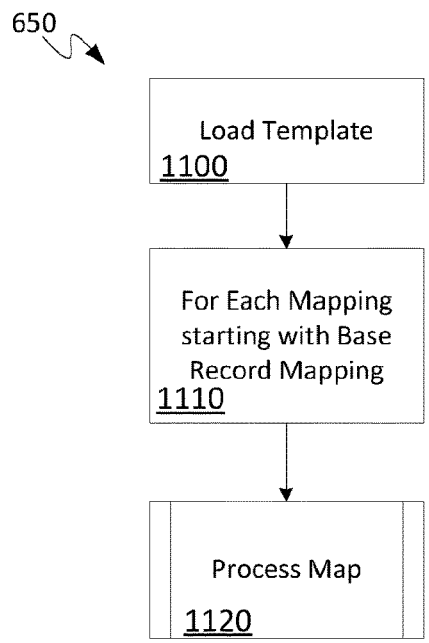
FIG. 11 is an exemplary illustration of the Process Template process used by the Mapping Engine to process a template.

Process Template process 650 includes a step of loading the Template 1000, see FIG. 11, step 1100. Template 1000 can act in two different modes. In Generation Mode, Template 1000 may be used to generate a new spreadsheet using Spreadsheet 1010 stored in Template 1000 as a starting point. This mode is dictated by Base Record 1030 in Template 1000 only containing the table from the database but no ID. The ID of the exact record is passed into Process Template process 650 and is combined with Base Record 1030 table for processing. Continuation Mode is when the Template continues using a previously generated spreadsheet and Spreadsheet 1010 stored in Template 1000 is the last saved version of the previously generated spreadsheet. This allows for Template 1000 to store changes to data, formatting, etc. in the spreadsheet that is not mapped.

Options 1020 may contain specific options on how to handle the processing and rendering of the spreadsheet.

Mappings 1040 may contain Record Map(s) 900 and Table Map(s) 910. While only one Record Map 900 and one Table Map 910 are shown in FIG. 9, multiple Record Maps 900 and multiple Table Maps 910 can be defined.

After the Record Maps 900 and Table Maps 910 are loaded, Process Map process 1120 is processed for each defined Record Map 900 and Table Map 910 loaded per step 1110. The first map processed will be the Record Map 900 that specifying the same Table as in Base Record 1030.

Figure 12:
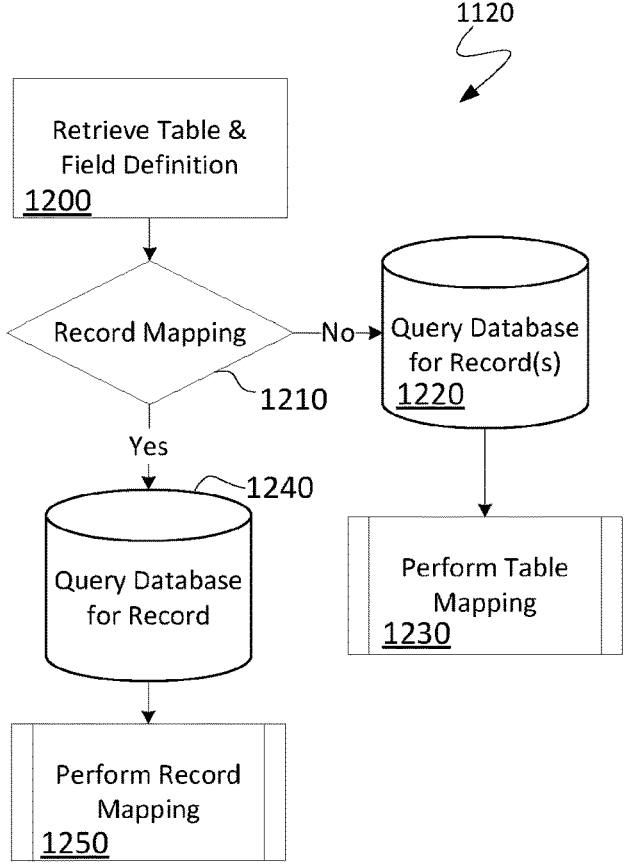
FIG. 12 is an exemplary illustration of the Process Map process, used by the Mapping Engine to process a Map definition from the Template.

With reference to FIGS. 6, 11, and 12, Process Map process 1120 starts a step for retrieving the Table and Field Definitions 1200 from the Database 620. This definition is stored in Mapping Engine 630 to enable Mapping Engine 630 to conform and transform information to and from Database 620. For the Query from the Database in steps 1220 and 1240, the Query and Base Record from the Map is used to determine the exact database query needed to get the record or records. If the Map type is Record as determined at step 1210, then step 1240 queries the database for the specified record and then Perform Record Mapping process 1250 is performed; otherwise, step 1220 retrieves the records from the database and Perform Table Mapping 1230 is performed.

Figure 13:
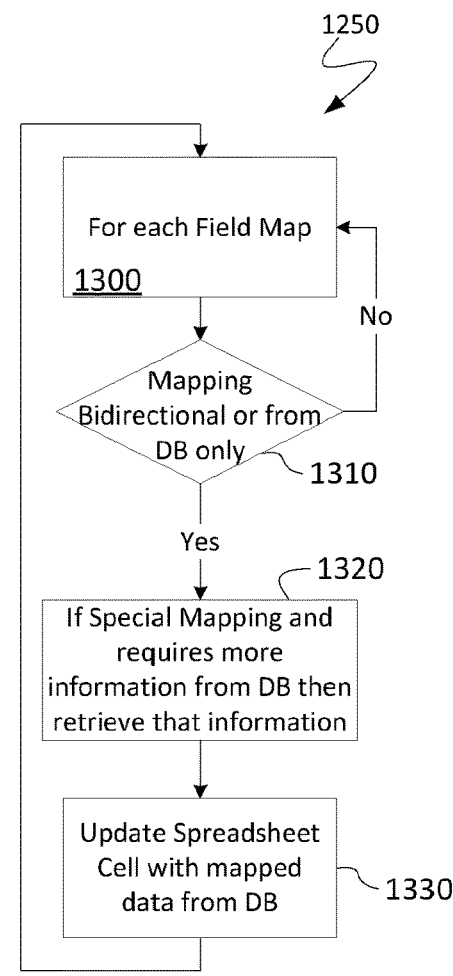
FIG. 13 is an exemplary illustration of the Perform Record Mapping process, illustrating a process the Mapping Engine uses to perform a Record Mapping.

With reference to FIGS. 9 and 13, a Perform Record Mapping process 1250 starts at a step 1300 by going through each Field Map 905 in Record Map 900. If the Mapping is not Bidirectional or comes from Database Only, as tested at step 1310, then nothing is done for that Field Map 905. This is to handle To Database Only Field Maps that have a formula in the spreadsheet cell that maps only its value back to the database and is never overwritten by data from the database. This enables formulas to be used in the spreadsheet and its calculation engine to update the database with its results.

Otherwise, at step 1320, if Special Mapping and more information from the Database is needed, then that information is retrieved from the database and stored in the Mapping Engine 630. For example, in a choice list, the database value may be a number, but the display value to the user could be a list of text strings, such as used in a drop-down choice list. That choice list and those mappings must be loaded from the database for the spreadsheet UI to be usable by the end user.

Then, at step 1330, the cell in the spreadsheet is mapped with the data from the database. If it is a Special Mapping cell, the display value is determined by going through the Special Mapping routine. Special Mappings can be a drop-down of a choice list such as mentioned regarding step 1320, perhaps a related record like a User Name from a User Record, and would require the list of User Records to be selectable by the end user. A Special Mapping cell can also be something like currency, formatted numbers, dates, etc. This includes anything that requires a translation from the stored database value and the display value presented to the end user.

Figure 14:
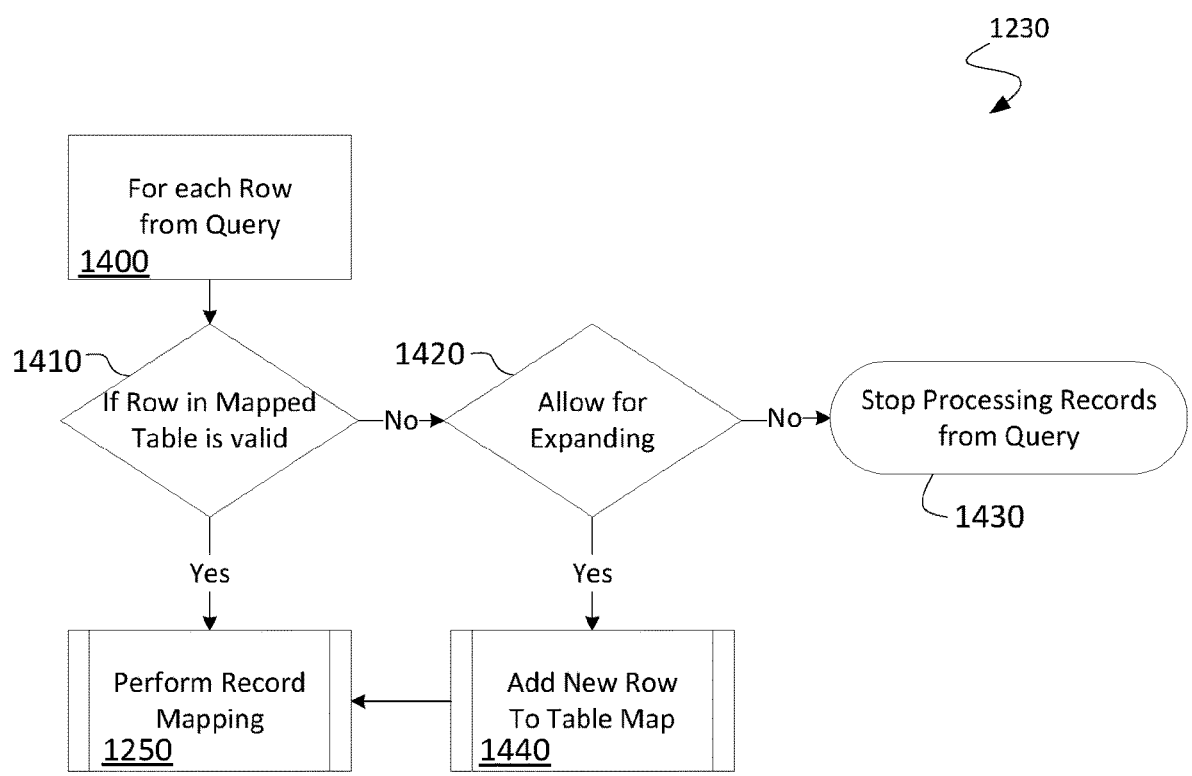
FIG. 14 is an exemplary illustration of the Perform Table Mapping process, illustrating a process the Mapping Engine uses to perform a Table Mapping.

With reference to FIG. 14, a Perform Table Mapping process 1230 starts by processing each row from the Query from the database at step 1400. The rows from the Query are mapped starting at the first row in the Range specified in Table Map 910. The mapping continues until the final row in the Range is reached, so that each row from the Query corresponds to an equivalent row in the range (First Row in Range+Query Row number−1). If the current row from the Query is in the Mapped Range, determined at step 1410, then the process continues with Perform Record Mapping process 1250. Otherwise the Row is not valid. Such a row will then be the First Row in Range+Query Row number−1>Last Row in Range. If the Row is not valid, then a check with the Options from Table Map 910 is performed at step 1420 to see if the Options allow for the table range to be expanded as needed for queries. If not allowed, then this Table Mapping is complete, and processing on the Table Map is stopped at step 1430.

Figure 15:
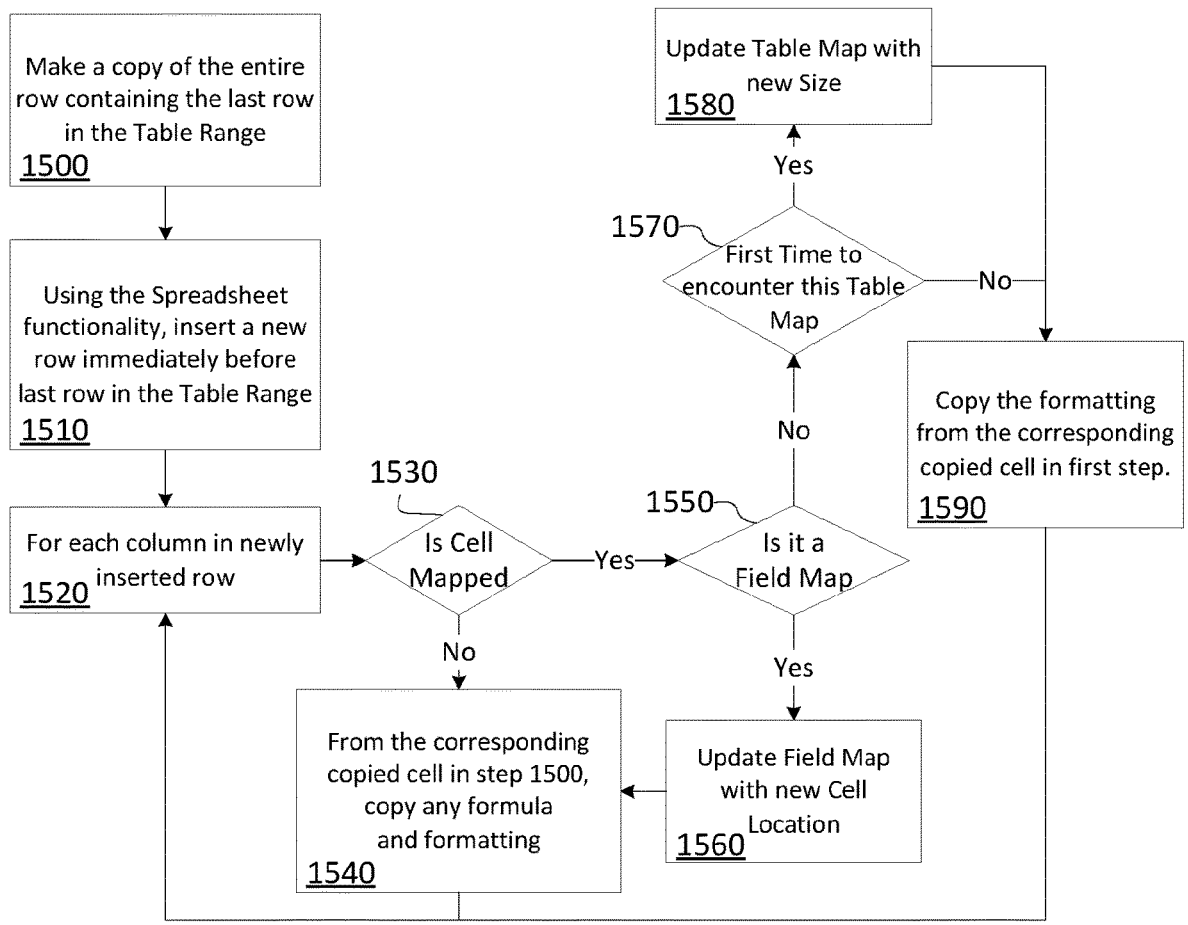
FIG. 15 is an exemplary illustration of the Add New Row to Table Map process, a Process diagram showing how the Mapping Engine adds a new row to a Table Map.

To accommodate a new row, Add New Row To Table Map process 1440, further detailed with reference to FIG. 15, is processed.

Perform Record Mapping process 1250, as further detailed in FIG. 13 handles the mappings. Field Map 905 is generated by using Field, Type, and Protected selections from Column Map 915. The cell is determined by a mapped row of the query row in the Range. The column is determined by First Column in Range+Column Map index−1. This row:column will be used as the Cell in Field Map 905.

With reference to FIG. 15, illustrating Add New Row to Table Map process 1440, a new row may be added to the Range in a Table Map 910. At first step 1500, the entire row that is the last row in the Range is copied. For each cell, the data, type, and formatting are copied.

At step 1510, the spreadsheet insert row functionality is used to insert a new row immediately before the last row in the Range. This will cause all the rows after that row to increment by one, and a new "blank" row will be inserted. The spreadsheet formulas will be updated by the spreadsheet application to change any references to rows that were changed to their new value.

For each column in the new row, at step 1520, the column/cell is checked at step 1530 to see if it is mapped, i.e., it is in a Range in any Table Map or is in a Field Map in any Record Maps. If it is not, then the corresponding cell from the copy made at step 1500 is copied into the new cell at step 1540. Any formula and all formatting are copied. The process then continues at step 1520.

At step 1550, the cell is checked to see if it is mapped as a Field Map 905 in Record Map 900. If it is, the Field Map 905 Cell location is updated at step 1560 to reflect the new location of the field by incrementing its row by 1. Then the process continues at step 1540.

If step 1550 determines that it is not a Field Map 905, then the cell is in a Table Map 910. At step 1570, a check is made to determine if this Add New Row to Table Map process 1440 is encountering this Table Map for the first time. If so, at step 1580, the Range in the Table Map 910 is updated, with the Range Row incremented by 1.

After step 1580 or if the Table Map 910 has been encountered before, the formatting from the corresponding cell in the copy from step 1500 is copied into the new cell at step 1590. The process then continues at step 1520.

Figure 16:
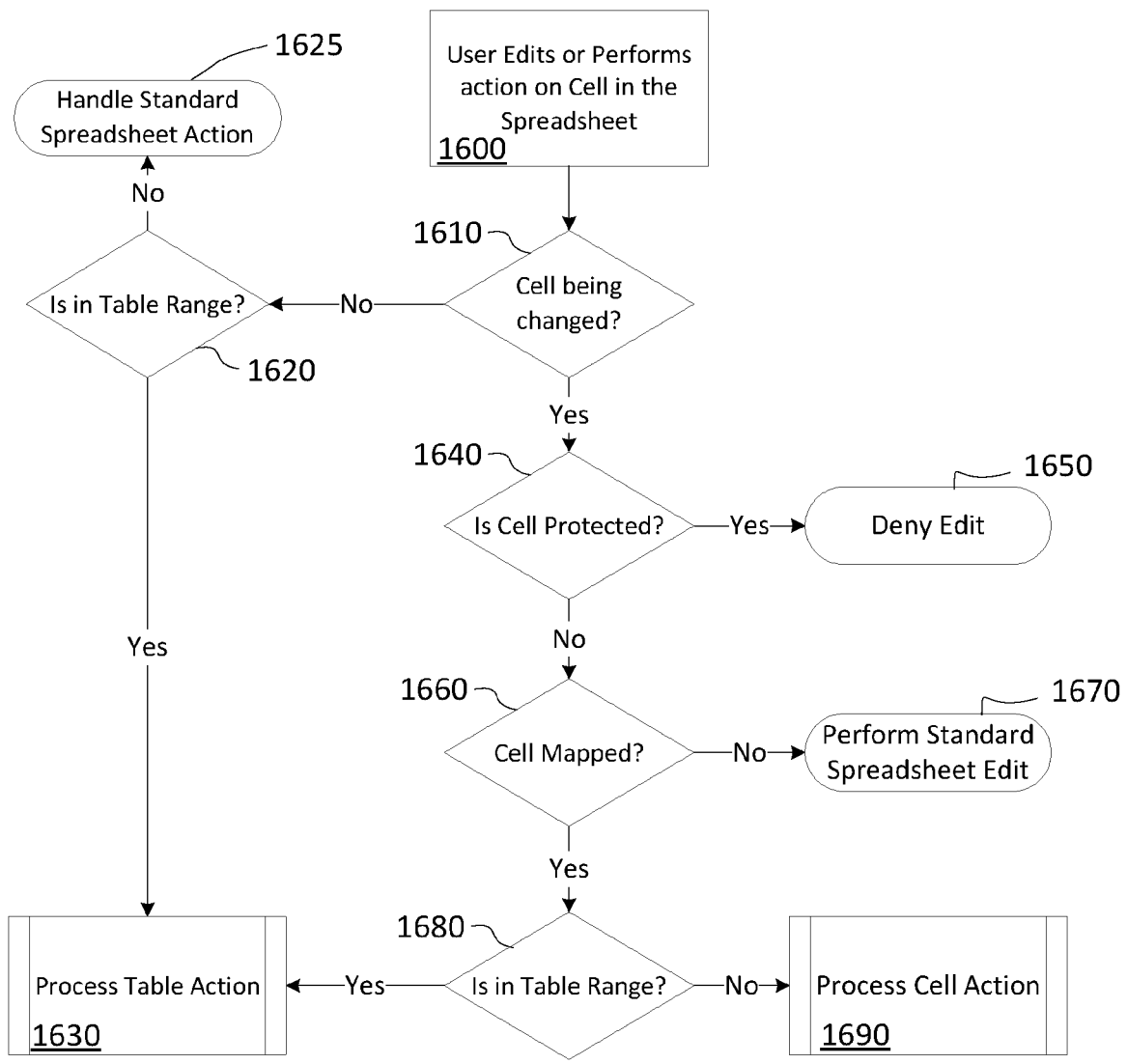
FIG. 16 is an exemplary illustration of the Process User Action process, a Process diagram showing how the Mapping Engine handles an action from the end user.
Figure 17:
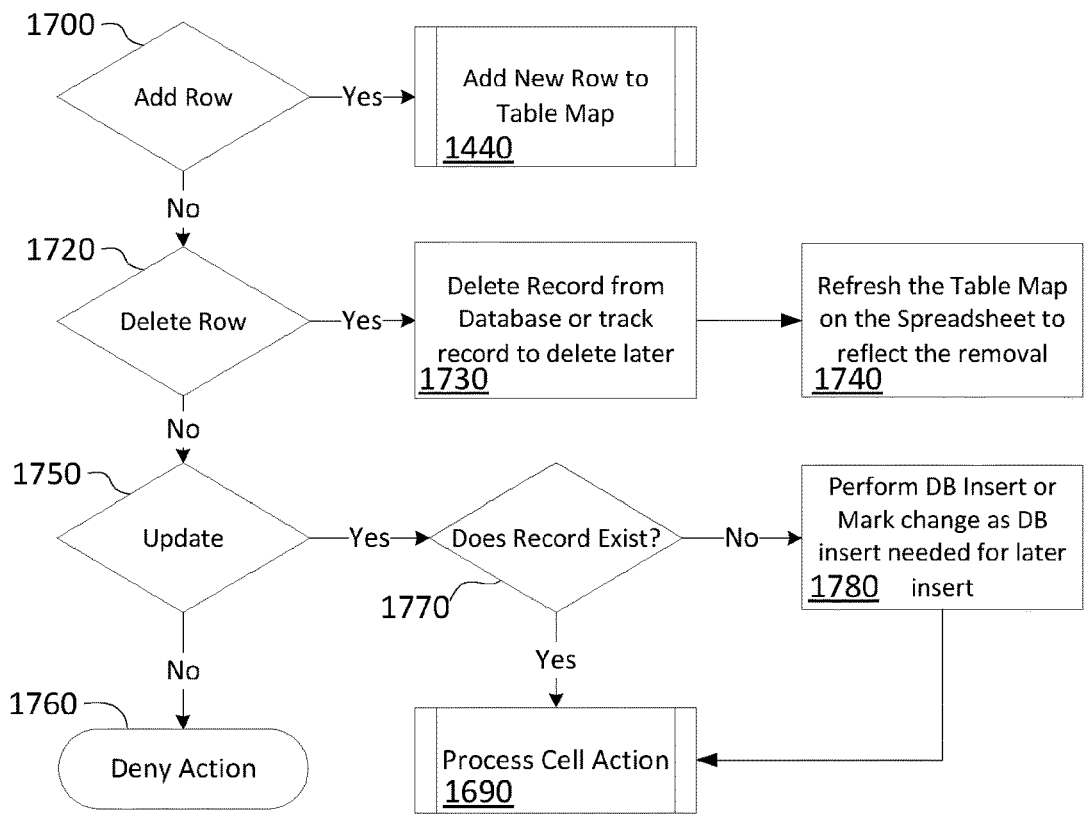
FIG. 17 is an exemplary illustration of the Process Table Action process, a Process diagram showing how the Mapping Engine handles an end user action affecting a Table Map.

Referring to FIG. 16, a Process User Action process 660 handles the events from the spreadsheet that a user invokes through the spreadsheet user interface. Process 660 starts at step 1600 when the user performs an action on a cell in the spreadsheet. The action is interrogated at step 1610 to determine if the action causes the cell to be changed. If no change is to occur, then the cell is checked at step 1620 to see if it is in any Map Table Range. If it is not, then the action is passed at step 1625 to the standard spreadsheet actions as it will not affect the Mapping Engine 630. If the cell is in a Map Table Range, then Process Table Action 1630, detailed in FIG. 17, is performed.

Figure 19:
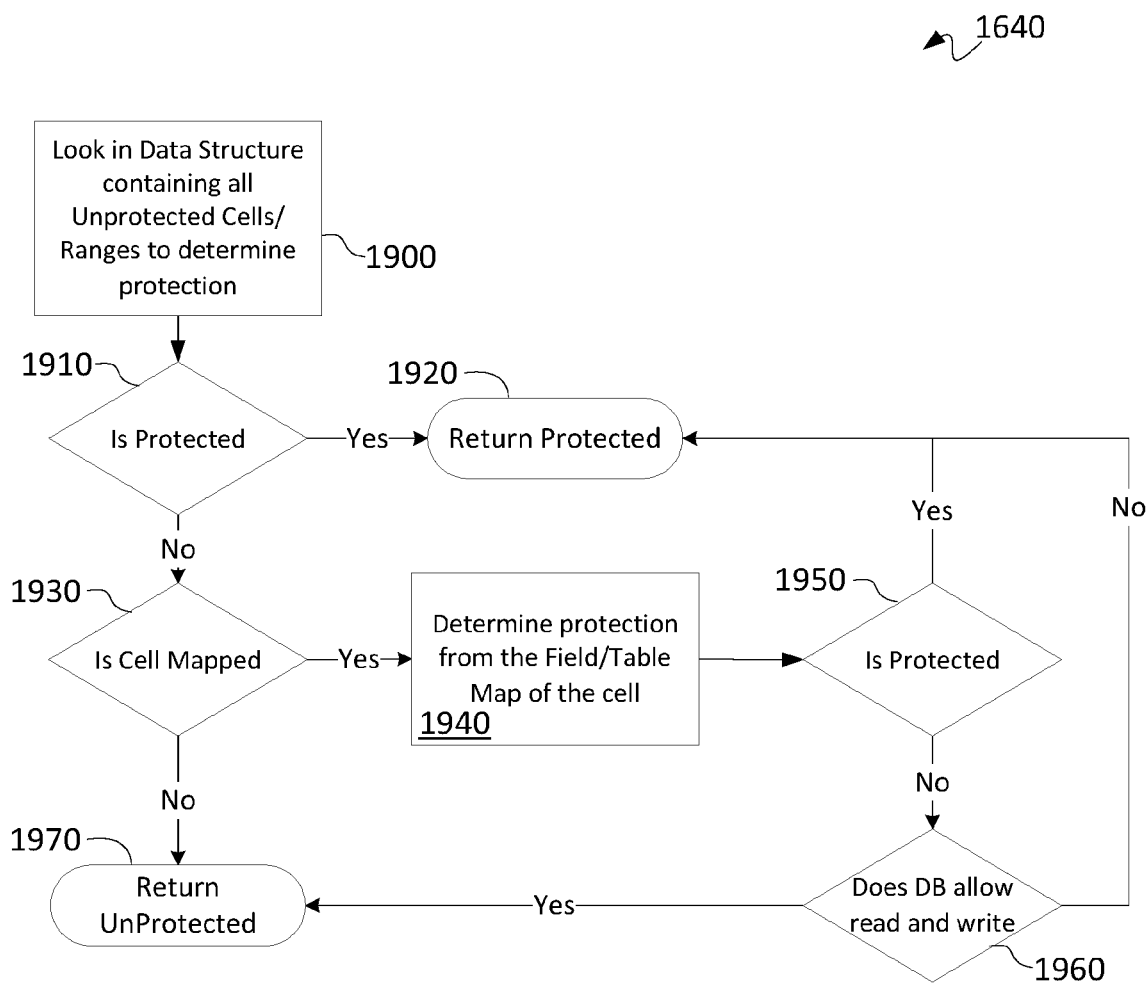
FIG. 19 is an exemplary illustration of the Determine Protection process, a Process diagram showing how the Mapping Engine determines if a cell is protected.

If the Cell is being changed as determined at step 1610, the Determine Protection process 1640, further detailed in FIG. 19, is used to see if the cell is protected. If it is protected, the change is denied at step 1650.

If the Cell is not protected as determined at step 1640, then all Table and Record Maps are checked to see if the Cell is in any of the Maps at step 1660. If not, the Cell is not part of any Map and the spreadsheet standard edit/change is then processed at step 1670.

Figure 18:
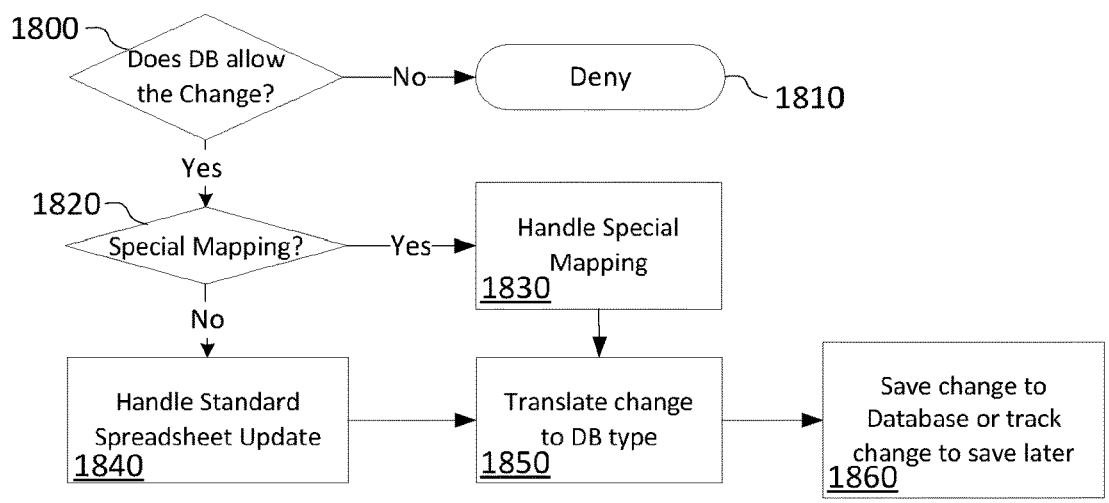
FIG. 18 is an exemplary illustration of the Process Cell Action process, a Process diagram showing how the Mapping Engine handles an end user action affecting a cell in the spreadsheet.

Otherwise, at step 1680 it is determined if the Cell is in a Table Range. If not, then the Process Cell Action process 1690, further detailed in FIG. 18, is performed. Otherwise, the Process Table Action process 1630 is performed.

With reference to FIG. 17, Process Table Action process 1630 starts at step 1700 by checking to see if the action is to add a row to the Table Map 910 Range. If a row is to be added, then Add New Row to Table Map process 1440 is invoked.

If the action is not to add a row, then at step 1720, the action is checked to see if it is to delete a row. If a row is to be deleted, then the row in which the Cell Action occurred is used to determine what record from the Table Map 910 Query is to be deleted. That record is deleted or is traced to be deleted later at step 1730. The record is also removed from the records stored in the Mapping Engine to reflect the Table Map on the spreadsheet with the deleted row. The table is refreshed from Table Map 910 at step 1740. This will cause the removal of the deleted record on the spreadsheet, and will adjust the Table Map 910 appropriately with new data or blank rows depending upon the options for Table Map 910 (see FIG. 14, Perform Table Mapping process 1230).

If the determination at step 1720 is not to delete a row, the action is checked at step 1750 to see if it will cause an update to the cell. If it will not, then the action is denied at step 1760. Otherwise the row in which that Cell Action occurred is used to determine what record from the Table Map Query is being updated at step 1770.

If the row is not currently being mapped to a record (i.e., the number of rows from the Table Map Query contains fewer records than the number of rows in the Table Map Range and one of the unmapped rows is where the Cell Action occurred), then either a record is inserted into the database or this record is marked as existing and will need to be inserted later. When the record is inserted, the Table Map Query is used to determine the appropriate field values to maintain the proper relationship.

If the record exists as determined at step 1770 or after step 1780, the Process Cell Action process 1690 is processed (see FIG. 18).

With reference to FIG. 18, Process Cell Action process 1690 starts at step 1800 by checking whether or not Database 620 allows the user to change the field/record correlated to the record/field from Table Map 910. The permissions from the initialization of Table Map 910 (see FIG. 12—Process Map process 1120 step 1200) are used for this determination.

If the database doesn't allow the user to make the change, then the action is denied at step 1810. Otherwise, at step 1820, the Mapping is checked to determine if this Cell requires a special mapping. If it does, then the special mapping is performed at step 1830. Otherwise, the standard spreadsheet functionality is used to update the cell at step 1840.

Once the cell has the new value, that value is used at step 1850 to translate the value back to what the database requires. This step can be simple as in text strings requiring no translation, or as complex as needing to provide a record ID to a related table to store as a reference in related tables. This step is very dependent upon the database being used and the types of data formats to support.

When this step is completed, the database is either updated with the translated value or it is tracked as needing to be saved later at step 1860.

With reference to FIG. 19, Determine Protection process 1640 for the cell in question starts at step 1900 by looking in the Mapping Engine data structure, see FIG. 9, which contains a list of all protected ranges. If the cell is in any of these ranges as determined at step 1910, then it is protected and the process returns the response protected at step 1920.

If the cell is not protected, it is then checked to see if it is in any Record or Table Map at step 1930. If it is not mapped, then the process returns 'Unprotected' at step 1970. Otherwise, as shown above, the Map is used to check the cell's protection status at step 1940. If the cell is in a Field Map, the Map has a property to determine if that field is protected. If it is in a Table Map, the field's Column Map Protected property is used to determine whether or not it is protected. If the mapping is protected as determined at step 1950, then the process returns protected at step 1920.

Otherwise, at step 1960, the database is checked as to whether or not the user is allowed to change the field/record correlated to the record/field from the Table Map. The permissions from the initialization of the Table Map (see FIG. 12—Process Map process 1120 step 1200) are used for this determination. If the database doesn't allow the change, then the process returns protected at step 1920, otherwise the process returns unprotected at step 1970.

Summary of Exemplary Embodiments

Applications provide the End User presentation of Data from Databases in various manners. Two such methods are, one, to show a single Record in a Form View or, two, to show a list of Records in a List View. A combination of both can be used where the Form View contains one or more List Views associated with the Record being viewed. While the data is being viewed, changes to the data may be made by the user changing the underlining Data or even adding or removing new Data in the List Views.

Spreadsheets have been used to help manage Data. This has typically meant that a Query for Data is mapped into a Spreadsheet. The Data from the Database is retrieved and put into a region in the Spreadsheet. Additional controls may be present to 'refresh' the data with current data from the Database or even update the Database Data with any changes in the Spreadsheet.

The result of End User Interface for Database Data with Spreadsheets is to combine these previous methods into a new method to create a new User Interface to Database Data. This is done by using a Spreadsheet as the UI, and by having all the Data presented to the End User be mapped into the Spreadsheet in a repeatable manner. As in the combination of the Form View and List View, a Record serves as the basis of the Data to be presented and the Lists from the List Views are mapped into Managed Regions in the Spreadsheet. With this new UI and its required mappings, a new means to create Applications is now possible. An existing Spreadsheet can be used to create a new Application. The Spreadsheet mappings are created. These mappings are then used to create the Tables in the Database to store the required data and relationships. The End User UI is now complete, because the Spreadsheet is now the UI for the End User using the Mapping Engine to Process User Action.

Therefore, the following is claimed:

1. In a computer system, a method for using a spreadsheet as a user interface to a database operably connected to the computer system, the computer system having one or more processors and storage, the method carried out through execution of program instructions executed by the one or more processors, the method comprising:
 instantiating a mapping engine, the mapping engine operable to retrieve, manipulate, and store data in the database, in the spreadsheet, and in a plurality of data structures of types including:
  cell maps, a cell map being a type of data structure adapted to bidirectional mapping or translating of data values inputted and displayed via the spreadsheet to data values stored and retrieved from the database,
  column maps, a column map being a type of data structure associating a database table field with a spreadsheet range column and optionally having one or more cell maps,
  table maps, a table map being a type of data structure associating a query on a database table with a spreadsheet range and optionally having one or more column maps,
  field maps, a field map being a type of data structure associating a database table field with a spreadsheet cell and optionally having one or more cell maps, and
  record maps, a record map being a type of data structure identifying a database table and having a query on the database table, and optionally having one or more field maps,
 instantiating the mapping engine including:
  retrieving a template from storage or the database, the template having the spreadsheet, one or more table maps, and one or more record maps of which one is a base record map;
  iterating, over the template's one or more table maps and one or more record maps beginning with the base record map, the following steps:

if the iteration is for a one of said one or more record maps: using the query associated with said one record map to retrieve a record from the database and iterating over each field map associated with said one record map to update the spreadsheet cell associated with the iterated field map with the data from the retrieved record stored at the field associated with the iterated field map, applying the mapping or translation designated in the cell map associated with the iterated field map, if any, if the iteration is for a one of said one or more table maps: using the query associated with said one table map to retrieve one or more records from the database and iterating over each retrieved record as follows: iterating over each column map associated with said one table map to update a spreadsheet cell at R:C in the spreadsheet range associated with said one table map with the data from the iterated retrieved record stored at the field associated with the iterated column map, applying the mapping or translation designated in the cell map associated with the iterated column map, if any, where C is the column associated with the iterated column map and R is the ordinal number of the current retrieved record iteration for said one table map;

installing calls to the mapping engine into the spreadsheet, whereby when the user attempts an action on the spreadsheet, the mapping engine is called;

presenting the spreadsheet to the user;

when the user takes an action affecting a cell in the spreadsheet, invoking the mapping engine to take the following steps:

determining whether the cell is associated with any table map or record map in the template and, if not, then permitting the action;

determining whether the cell is in a range associated with any table map in the template and the action is to change the value of the cell and, if so, then:

permitting the action affecting the cell, determining whether any record for the cell exists in the database table associated by the associated table map and inserting a record if no record exists, and storing the cell value resulting after the action in the database table after first applying the mapping or translating designated in a cell map associated with the cell, if any;

determining whether the cell is in a range associated with any table map in the template and the action is to add a row and, if so, performing the action by:

making a copy of the spreadsheet row containing the last row in the associated range, causing the spreadsheet to insert a new row above the last row in the associated range, iterating over each cell in the new row by copying, if the iterated cell is not in any table map or record map, any format and formula of the cell in the same column in the copy of the spreadsheet row to the iterated cell, iterating over each field map associated with one or more cells in the new row, updating the iterated field map with the new cell location, and iterating over each table map associated with one or more cells in the new row, copying any format from the same column in the copy of the spreadsheet row correspondingly to each of the one or more cells, and if necessary, updating the iterated table map with new row size information;

determining whether the cell is in a range associated with any table map in the template and the action is to delete a row and, if so, then deleting the corresponding record from the database and refreshing the associated table map to reflect the deletions; and determining whether the cell is associated with any table map or record map in the template and not in a range associated with any table map in the template and, if so, then permitting the action affecting the cell and storing the cell value resulting after the action in the database after first applying the mapping or translating designated in a cell map associated with the cell, if any.

2. The method of claim 1 wherein invoking the mapping engine when the user takes an action affecting a cell in the spreadsheet further comprises the steps of:

determining whether the cell is protected, and denying the action if the cell is determined to be protected.

3. The method of claim 2 wherein the field map and column map data structures each further comprise a protection indication flag and the step of determining whether the cell is protected includes the following steps:

determining that the cell is protected if the cell is associated with a data structure of types field map or column map for which the protection indication flag indicates that the cell is protected, and determining that the cell is protected if it is determined that the database does not permit the user to make changes to the database.

4. The method of claim 3 wherein determining that the database does not permit the user to make changes to the database includes determining that the database does not permit the user to make changes to the field or record associated with the cell by the associated field map or column map.

5. The method of claim 1 wherein using the query associated with the iterated record map or the iterated table map includes dynamically modifying the query with one or more values obtained via a reference.

6. The method of claim 5 wherein the one or more values obtained via a reference include one or more values obtained using a base record reference, a field map reference, or a spreadsheet cell reference.

* * * * *